H. W. FLOYD.
MOTION PICTURE FILM WINDER.
APPLICATION FILED APR. 13, 1917.
1,259,091.
Patented Mar. 12, 1918.
3 SHEETS—SHEET 1.
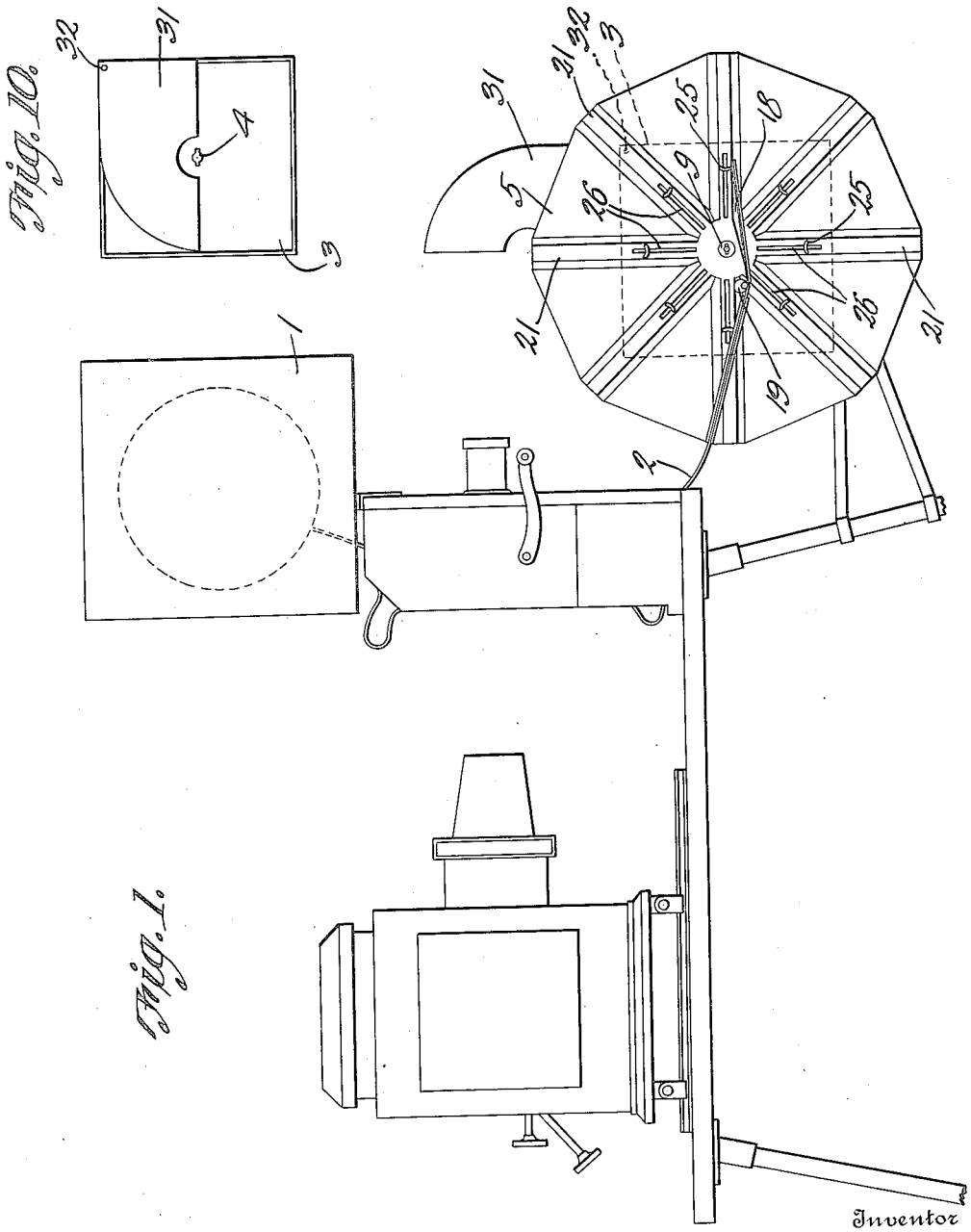
Witness
J. C. Tomley
R. L. Parker
Inventor
H. W. Floyd
By C. A. Snow & Co.
Attorney H. W. FLOYD.
MOTION PICTURE FILM WINDER.
APPLICATION FILED APR. 13, 1917.
1,259,091.
Patented Mar. 12, 1918.
3 SHEETS—SHEET 2.
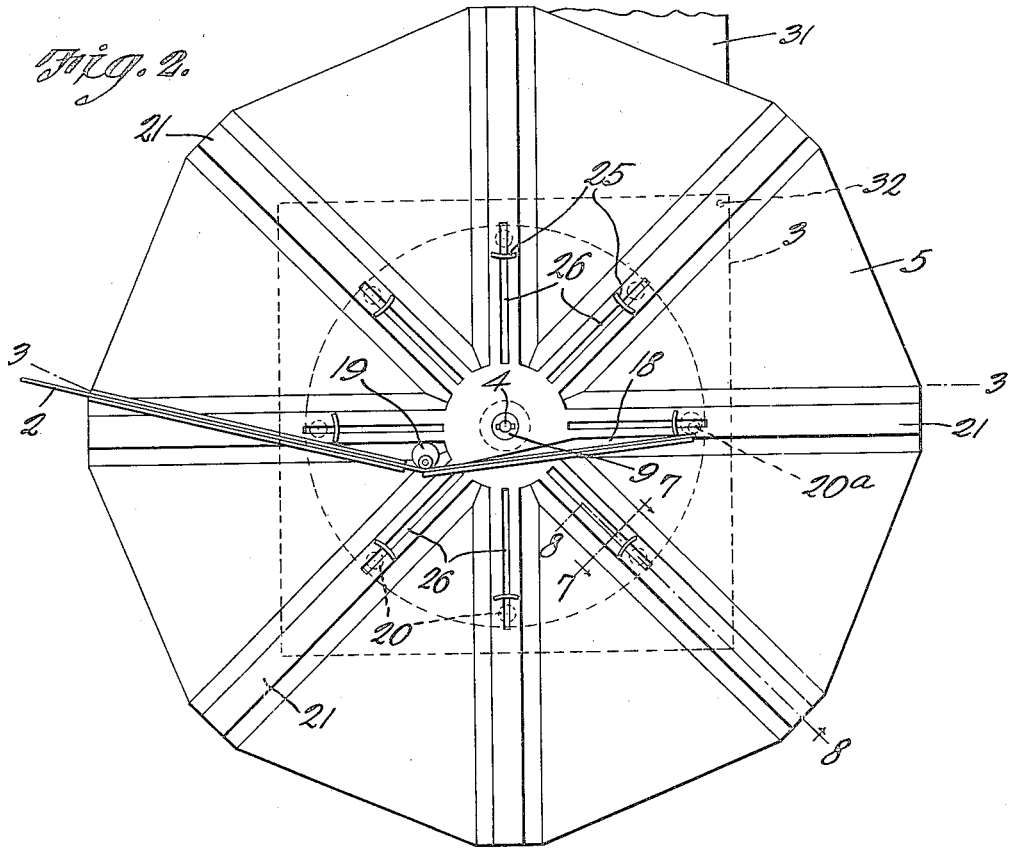
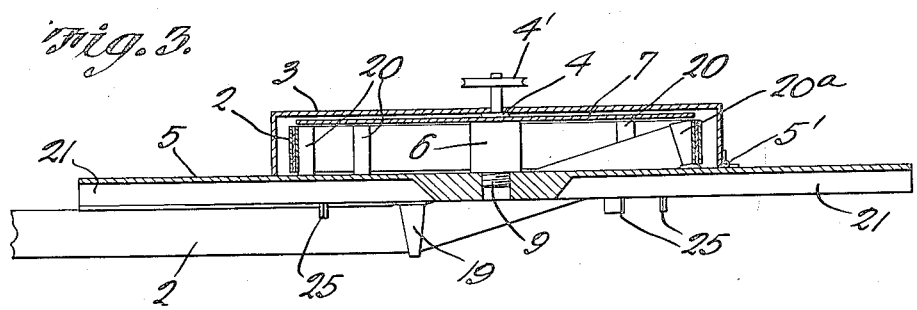
Witness
J R Tomey
R Z Parker
Inventor
H. W. Floyd
By C. A. Snow & Co.
Attorney H. W. FLOYD.
MOTION PICTURE FILM WINDER.
APPLICATION FILED APR. 13, 1917.
1,259,091.
Patented Mar. 12, 1918.
3 SHEETS—SHEET 3.
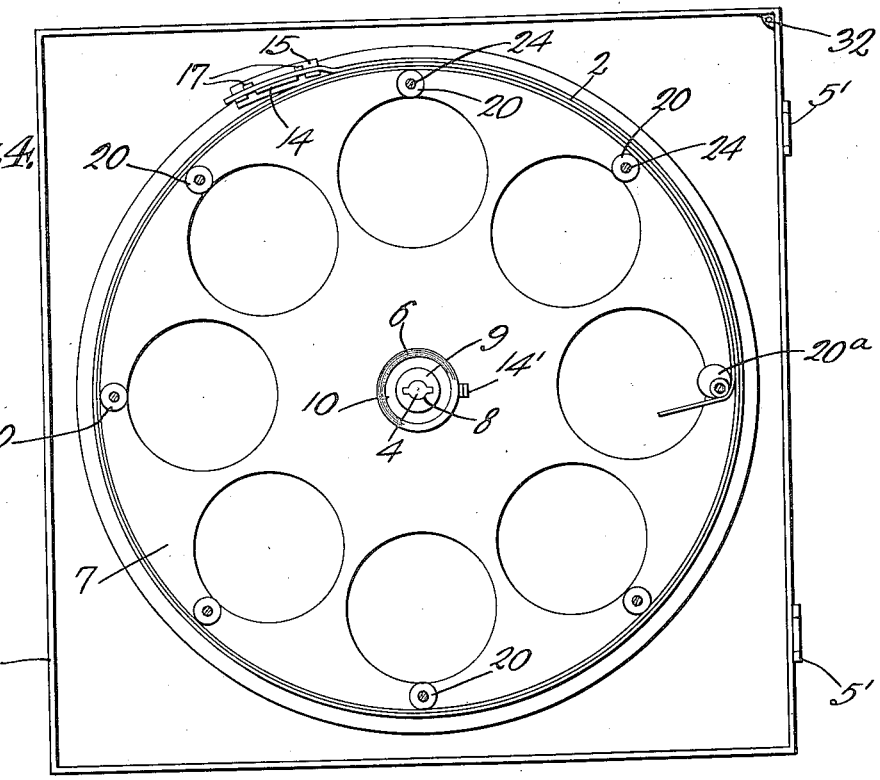
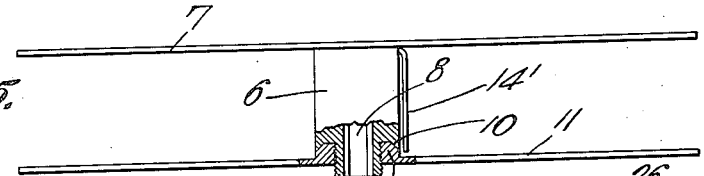
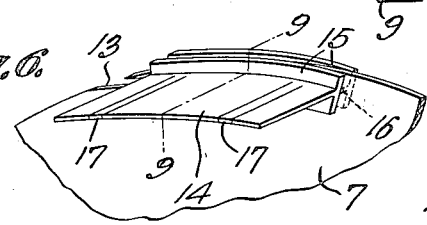
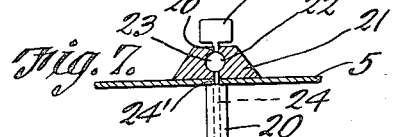
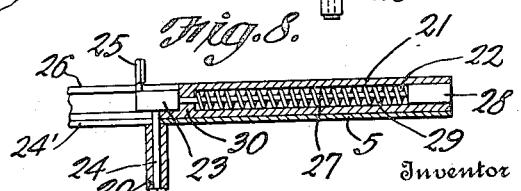
Inventor
H. W. Floyd
Witness
By C. A. Snow & Co.
Attorney

UNITED STATES PATENT OFFICE.

HARRY W. FLOYD, OF CAPRON, OKLAHOMA.

MOTION-PICTURE-FILM WINDER.

1,259,091.

Specification of Letters Patent. Patented Mar. 12, 1918.

Application filed April 13, 1917. Serial No. 161,789.

*To all whom it may concern:*

Be it known that I, HARRY W. FLOYD, a citizen of the United States, residing at Capron, in the county of Woods and State of Oklahoma, have invented a new and useful Motion-Picture-Film Winder, of which the following is a specification.

The present invention appertains to devices for winding up motion picture films and the like, and aims to provide a novel and improved appliance of that nature for winding up a film with the forward end outermost, whereby rewinding is unnecessary, it being well known that films in being wound up in the ordinary manner, require a rewinding thereof to bring the forward end of the film outermost.

It is the object of the invention to provide a film winding device embodying a novel assemblage of the component elements, whereby the film after passing through the projecting apparatus is wound up with its forward end outermost, in order that the film need not be rewound for subsequent use, it merely being transferred from winding to unwinding position on the projecting apparatus or motion picture machine.

The invention has for a more specific object, the combination with a reel having means at its periphery for the engagement of the forward end of the film, of means for applying the film to the reel whereby it is wound from the peripheral portion of the reel inward toward the hub, the convolutions or turns of the film being held together snugly during the winding thereof, and the reel being readily removed when filled.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawings, wherein:—

Figure 1 is an elevation of a motion picture machine illustrating the improved film winder applied thereto.

Fig. 2 is an enlarged side elevation of the device.

Fig. 3 is a horizontal section taken on the line 3—3 of Fig. 2.

Fig. 4 is an elevation showing the lower film box with the cover removed to illustrate the interior parts.

Fig. 5 is a view of the complete reel with the removable side plate attached thereto, portions being shown in section.

Fig. 6 is a perspective view illustrating the means for attaching the forward end of the film to the reel.

Figs. 7 and 8 are sectional views on the respective lines 7—7 and 8—8 of Fig. 2.

Fig. 9 is a sectional detail on the line 9—9 of Fig. 6.

Fig. 10 is an elevation of the film box with the cover removed and film holding wing or plate swung into position, the reel also being removed.

In Fig. 1, there is illustrated the upper box 1 containing the reel from which the film 2 is unwound to pass through the projecting apparatus to the lower film box 3 with which the present device is assembled, it being understood that the present construction can be altered, within the scope of what is hereinafter claimed, in adapting the device to various makes of motion picture machines. The box 3 can be supported in any suitable manner according to the circumstances and in the proper position for receiving the film.

A stub shaft 4 is journaled for rotation through the back of the box or casing 3, and is rotated as usual by means of a pulley wheel 4' attached thereto or in any other suitable manner for winding up the film. A cover plate 5 is provided for the box 3 which is preferably of larger area than said box, and which is hinged, as at 5', to one edge of the box 3 to be swung open and closed any suitable means (not shown) being used for holding the plate 5 in closed position.

The reel which is placed removably within the box 3 embodies a hub 6 and a side plate or disk 7 permanently assembled with one end of the hub 6, said hub having a bore 8 of non-circular cross section to slip upon the shaft 4 within the box 3 when the cover plate 5 is swung open, whereby the reel will be rotated with said shaft, the reel being readily withdrawn when the plate 5 is swung open. The hub 6 is provided at its other end with a reduced boss 9 and a recess 10 surrounding said boss. An opposite side plate or disk 11 is provided for the reel, the same having a central hub section 12 adapted to be threaded onto the boss 9 and to fit within the recess 10. This plate 11 is only applied to the hub when the reel is removed with the film wound thereon, in which event the plate 11 can be applied to the hub for shipping or handling the film. When the reel is within the box 3, the plate 11 is detached therefrom and the plate 7 of the reel is adjacent to the back of the box.

The plate 7 of the reel is provided with means at one point of its margin for attachment of the forward end of the film 2. Thus, the marginal portion of the plate is provided with a spiral slot 13 extending therefrom for the attachment of an attaching plate 14 curved slightly to conform to the curvature of the slot 13. The plate 14 is provided at one edge with parallel flanges 15 to overlap the opposite sides of the plate 7, said flanges 15 being connected by a web 16 which moves longitudinally into the slot 13. Thus, when the web 16 is moved into the slot 13 with the flanges 15 overlapping the plate 7, the attaching plate 14 is firmly held in place. Said plate 14 has one or more spring tongues 17 under which the forward end of the film can be slipped to be gripped thereby against the plate 14, in order to carry the forward or outer end of the film with the plate 7 as it is rotated with the shaft 4.

The reel is also preferably provided with a spring tongue 14' extending from the plate 7 along the hub 6 for engaging the inner or rear end of the film and clamping it against the hub 6 after the film has been wound up.

From the projecting apparatus, the film 2 extends partially across the outer side of the plate 5, and said plate is provided in its central portion with a slot or opening 18 through which the film extends diagonally, as seen in Fig. 3, into the box 3. A tapered roller 19 is carried by the plate 5 at one end of the slot 18 for properly directing the film at an angle through the slot 18.

An annular series of rollers 20 are carried by the plate 5 and project into the box 3 when the plate is closed, and said rollers guide the film as it is wound up. The rollers 20 are mounted to move inwardly as the film is wound up, and hold the convolutions of the film together snugly during the winding thereof. One of said rollers, designated 20ª, is located at that end of the slot 18 opposite to the roller 19 and is tapered to properly guide the film 2 from the slot 18 into an annular path, as seen in Fig. 4, around the rollers. As a means for mounting said rollers, the plate 5 is provided upon its outer side with radial ribs 21 having longitudinal bores 22 in which plungers 23 are slidable radially. Said plungers have pintles 24 projecting through radial slots 24' in the plate 5, and the rollers 20 are mounted upon said pintles 24 and project from the inner side of the plate 5, whereby to be brought into proper position within the box 3 when the plate 5 is swung to closed position. The plungers 23 have outstanding finger pieces 25 working in longitudinal slots 26 with which the ribs 21 are provided, and said plungers have stems 27 projecting radially within the bores 22 from the center of the plate 5. Followers 28 are secured to the outer ends of the stems 27 and work within the bores 22, and coiled wire expansion springs 29 are disposed within the bores between the followers 28 and partitions 30 with which the ribs 21 are provided within said bores. Springs 29 are of sufficient tension to move the followers 28 and plungers 23 radially outward, to carry the rollers 20 with them, said parts being yieldable inward.

The operation of the device is as follows: The reel is placed within the box 3 after the cover plate 5 is swung open, the hub 6 being slipped onto the shaft 4, the attaching plate or clip 14 having been applied to the plate 7. The forward end of the film is then introduced through the slot 18 past the roller 19 and is moved around the roller 20ª and engaged with the attaching plate or clip 14. The cover plate 5 is then closed. Now, when the machine is operated, the shaft 4 will be rotated, thereby rotating the reel, and the forward end of the film will therefore be carried around with the single reel plate 7. This will carry the film around the rollers 20, the film moving from the projecting apparatus past the roller 19, through the slot 18, and thence past the roller 20ª and around the series of rollers 20 which press the inner convolution of the film outwardly. The film is thus wound up within itself, instead of upon itself, as usual, so that the forward end will be outermost, and as the film is wound up, the convolutions being laid one within the other, this will move the rollers 20 inwardly. The rollers 20 will move inwardly with the plungers or slides 23, pulling the followers 28 with them to compress the springs 29. The rollers 20 are thus spring pressed to hold the convolutions of the film snugly together during the winding thereof. After the film has been completely wound up, the filled reel can be readily removed. This is accomplished by pressing the finger pieces 25 inwardly, thereby withdrawing the rollers 20 from the innermost convolution of the film, and the cover plate 5 can then be swung open. The inner or rear end of the film is then preferably engaged under the spring tongue 14', and the reel is then slipped off of the shaft 4 and can be applied subsequently within the upper film box 1 to run the film through the projecting apparatus, without the necessity of the film being rewound as usual. The plate or clip 14 is removed from the reel and film when the reel is applied to the box 1. In handling or transporting the film, after the reel is removed from the box 3, the side plate 11 of the reel is attached to the hub 6 to hold the wound film snugly between the plates 7 and 11.

It is preferable to provide a plate or wing 31 pivoted, as at 32, to one of the upper corners of the box 3, and adapted to be swung downwardly across said box when the cover or door thereof is swung open, whereby to hold the film upon the reel.

Having thus described the invention, what is claimed as new is:—

1. A film winding device embodying a box, a cover therefor adapted to be opened, a removable reel within the box having means for carrying the forward end of a film therewith, yieldable means carried by the cover movable inwardly and around which the film is wound, said yieldable means being movable inwardly manually and means carried by the box movable to hold the film therein on the reel when the cover is opened.

2. A film winding device embodying a box, a cover plate therefor, adapted to be opened, a shaft projecting within the box, a reel removably engageable with the shaft within the box, means for connecting the forward end of a film to the reel near its periphery, plungers carried by said plate and slidable radially thereof, rollers carried by the plungers to project within the box and around which the film is carried by said means, springs for moving the plungers outwardly, said plate having a slot for the movement of the film therethrough into the box to one of said rollers, and the plungers having finger pieces to move them inwardly manually, and means movable to hold the film in the box when the cover plate is opened.

3. A film winding device embodying a box, a cover plate therefor, a shaft extending through the back of the box, a reel embodying a single side plate and a hub to fit removably on said shaft, means carried by said reel plate near the periphery thereof for the engagement of the forward end of a film, plungers slidable radially upon the outer side of the cover plate, the cover plate having means for guiding said plungers, and radial slots, pintles carried by the plungers to project within the box, rollers rotatable upon the pintles and around which the film is adapted to be carried with said means, springs for moving the plungers yieldably outward, and finger pieces carried by the plungers, the cover plate having a slot for the passage of the film into the box to one of said rollers.

In testimony that I claim the foregoing as my own, I have hereto affixed my signature in the presence of two witnesses.

HARRY W. FLOYD.

Witnesses:
    FRED J. FASH,
    A. LUTSCHY.